United States Patent
Finizio et al.

(10) Patent No.: US 8,942,900 B2
(45) Date of Patent: Jan. 27, 2015

(54) MANAGEMENT OF OPERATION OF MOTOR VEHICLE INTERNAL COMBUSTION ENGINE AND GEARBOX FOR LEAVING A MOTOR VEHICLE FREEWHEEL RUNNING CONDITION WITH INTERNAL COMBUSTION ENGINE OFF

(75) Inventors: Roberto Finizio, Turin (IT); Alessandro Polimeno, Turin (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 96 days.

(21) Appl. No.: 13/565,940

(22) Filed: Aug. 3, 2012

(65) Prior Publication Data
US 2013/0035830 A1  Feb. 7, 2013

(30) Foreign Application Priority Data
Aug. 4, 2011 (EP) .................... 11425213

(51) Int. Cl.
*G06F 19/00* (2011.01)
*B60W 10/00* (2006.01)
*B60W 30/18* (2012.01)

(52) U.S. Cl.
CPC . *B60W 30/18072* (2013.01); *B60W 2030/1809* (2013.01); *B60W 2520/10* (2013.01)

USPC .............................................. 701/67; 477/83

(58) Field of Classification Search
CPC ..... B60W 20/30; B60W 20/40; B60W 10/02; B60W 10/06
USPC .............................................. 701/67; 477/83
See application file for complete search history.

(56) References Cited

U.S. PATENT DOCUMENTS

| | | | |
|---|---|---|---|
| 6,939,268 B2 * | 9/2005 | DeVore et al. | 477/175 |
| 2009/0314559 A1 * | 12/2009 | Palitto | 180/65.22 |
| 2011/0054765 A1 * | 3/2011 | Lewis et al. | 701/112 |
| 2011/0136622 A1 * | 6/2011 | Enoki | 477/83 |

* cited by examiner

*Primary Examiner* — Fadey Jabr
*Assistant Examiner* — Aaron L Troost
(74) *Attorney, Agent, or Firm* — Dickstein Shapiro LLP

(57) ABSTRACT

An automotive electronic control system configured to control the powertrain to stop the internal combustion engine and disengage the drive line, which results in the motor vehicle entering a freewheel running condition with the internal combustion engine off. The control system is further configured to control the drive line during an internal combustion engine run-down after the motor vehicle enters the freewheel running condition, to cause a gear to engage for inertial cranking of the internal combustion engine before the internal combustion engine leaves a self-sustaining operating condition.

11 Claims, 2 Drawing Sheets

MANAGEMENT OF OPERATION OF MOTOR VEHICLE INTERNAL COMBUSTION ENGINE AND GEARBOX FOR LEAVING A MOTOR VEHICLE FREEWHEEL RUNNING CONDITION WITH INTERNAL COMBUSTION ENGINE OFF

TECHNICAL FIELD OF INVENTION

The present invention relates to management of operation of motor vehicle internal combustion engine and gearbox for leaving a motor vehicle freewheel (coast) running condition with internal combustion engine off.

STATE OF THE ART

In order to reduce fuel consumption and pollutant emissions of motor vehicles during urban driving, automotive manufacturers are progressively introducing so-called "Stop & Start" systems in motor vehicles, which have the task of switching off the internal combustion engine when the motor vehicle is about to stop and traction power is no longer required, and in particular when the speed of motor vehicles drops below a minimum speed, currently between 0 and 10 km/h, depending on the Manufacturer, and the gearbox is in neutral.

In order to further reduce fuel consumption and pollutant emissions in motor vehicles, it has been proposed to extend the operation of the Stop & Start system to motor vehicles equipped with a servo-actuated transmission, whether automatic or automated, so as to cause motor vehicles to freewheel with internal combustion engine off under special conditions. In particular, it has been proposed to stop the internal combustion engine and disengage the drive line, by disengaging the clutch, whenever the accelerator pedal is released or is not pressed for more than a given time interval, while the motor vehicle speed is less than a given speed higher than that used in Stop & Start systems, currently between 75 and 80 km/h, depending on the motor vehicle manufacturer, and then cranking the internal combustion engine and subsequently engaging the drive line, by engaging the clutch, with a gear appropriate for providing the motor vehicle with traction power as soon as the accelerator pedal is pressed (again).

When the clutch is disengaged to cause the internal combustion engine run-down, the gear engaged at that moment can alternatively be kept engaged or be disengaged so as to cause the gearbox to be put into neutral. In this last case, the clutch can alternatively be re-engaged or expediently be kept disengaged, in this way reducing the wheels' drive load.

The internal combustion engine can be cranked up in various ways, in particular by inertial cranking, by fuel injection or by means of electric machines, such as the starter, which are connected to the internal combustion engine by means of belts or gears, and the way is chosen based on, amongst other things, the conditions of the motor vehicle, of the internal combustion engine and of the road (gradient, curve and grip), and on the driver's requests (pressure on the accelerator pedal, pressure on the brake pedal and use of the gearbox lever).

SUBJECT AND ABSTRACT OF THE INVENTION

The Applicant has carried out an in-depth study with the objective of identifying an operational control logic for the internal combustion engine and gearbox of a motor vehicle for leaving the motor vehicle freewheel running condition with the internal combustion engine off aimed at optimizing the times, fuel consumption and driveability of the motor vehicle.

The aim of the present invention is therefore providing solution that allows the above-indicated objective to be achieved.

This aim is achieved by the present invention in so far as it relates to an automotive electronic control system, an automotive electronic control unit, a software loadable in an automotive electronic control unit, and a motor vehicle, as defined in the appended claims.

DETAILED DESCRIPTION OF PREFERRED EMBODIMENTS OF THE INVENTION

The present invention will now be described in detail with reference to the attached figures to enable a person skilled in the art to implement and use it. Various modifications to the described embodiments will be immediately obvious to skilled persons and the generic principles described can be applied to other embodiments and applications without departing from the scope of protection of the present invention, as defined in the appended claims. Therefore, the present invention is not be considered limited to the described and illustrated embodiments, but is to be accorded the broadest scope of protection according to the principles and characteristics described, and claimed herein.

Figure 1:
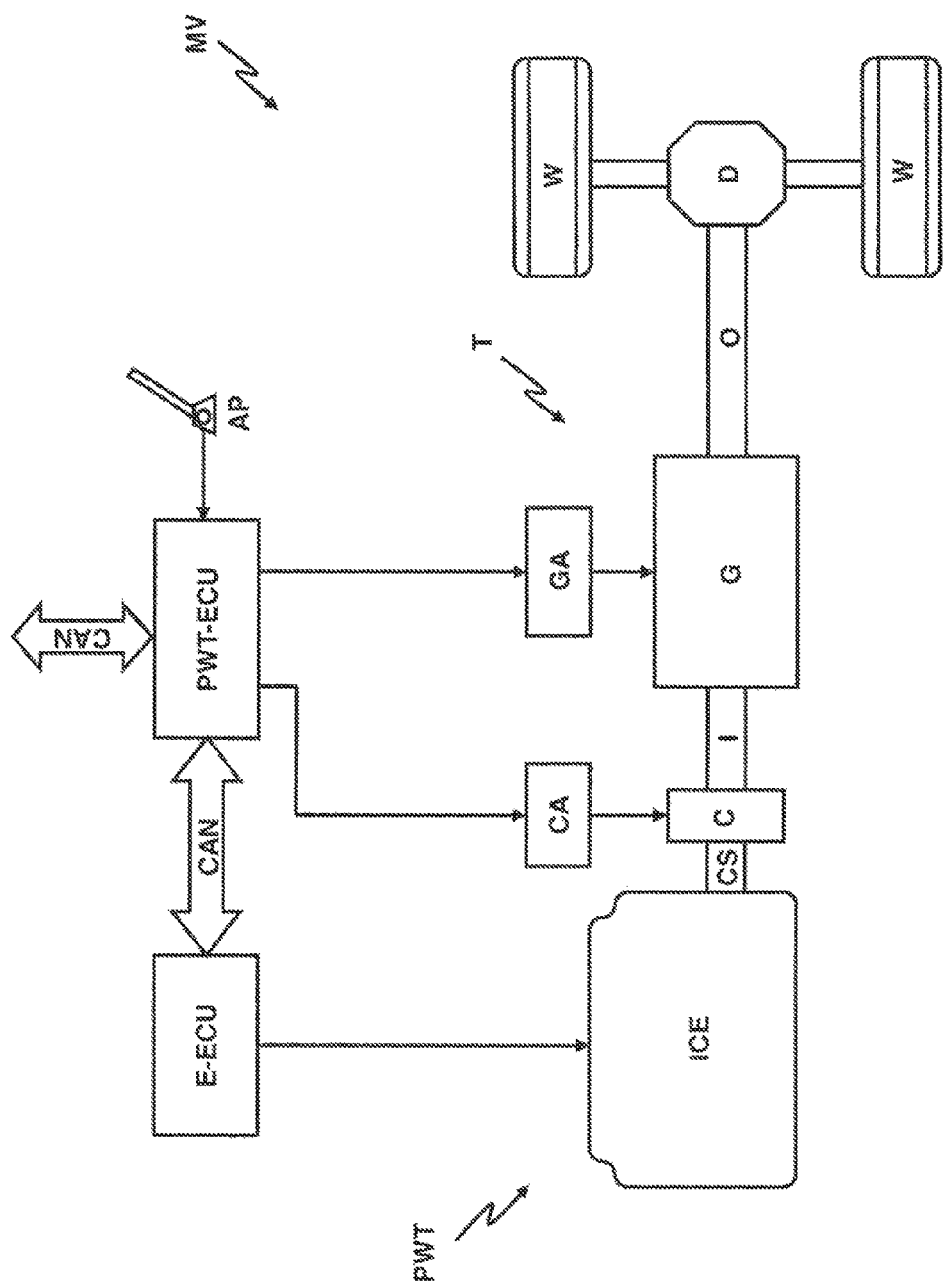
FIG. 1 is a block diagram of an automotive powertrain.

FIG. 1 shows, by way of a non-limitative example, a block diagram of a, powertrain PWT of a motor vehicle MV. The powertrain PWT comprises an internal combustion engine ICE with a crankshaft CS connected to a servo-actuated driveline T.

The driveline T can be indifferently of the type with a single clutch, as shown in FIG. 1, or with a double clutch (not shown).

In the case of a single-clutch drive line T, as shown in FIG. 1, the drive line T comprises a discrete-speed ratio gearbox G, with an input shaft I connectable to the crankshaft CS through a single clutch C external to the gearbox G and an output shaft O connected to a pair of driving wheels W through a differential D of known type.

The clutch C is servo-controlled by means of an associated electrically or electro-hydraulically controlled actuator CA. The gearbox G is also servo-controlled by means of a plurality of electrically or electro-hydraulically controlled actuators, indicated as a whole by GA, operable to cause engagement and disengagement of the gears.

In the case of a double-clutch drive line T, instead of a single clutch C external to the gearbox G, the drive line T comprises two distinct clutches (not shown), one associated with the even gears and the other associated with the odd gears, integrated inside the gearbox G.

The internal combustion engine ICE is controlled by an electronic control unit E-ECU, known per se and hence not described in detail, while the powertrain PWT as a whole is controlled by an electronic control unit PWT-ECU connected to the electronic control unit E-ECU of the internal combustion engine ICE via the motor vehicle CAN (Controller Area Network), as well as to the actuators CA and GA associated with the clutch C and the gearbox G, and programmed to cause the internal combustion engine run-down ICE, via the electronic control unit E-ECU, and the disengagement of the drive line T, by disengaging the clutch C, leaving the gear that is engaged at that moment in gear, or putting the gearbox G in neutral, via the actuators CA and GA, whenever the accelerator pedal AP of the motor vehicle MV is released or is not pressed for more than a given time interval, while the motor vehicle speed is lower than a given threshold speed, and the cranking of the internal combustion engine ICE, always via the electronic control unit E-ECU, and the engagement of the drive line T, by engaging the clutch C, always via the actuators CA and GA, as soon as the accelerator pedal AP is pressed (again).

In a different embodiment, the electronic control unit E-ECU of the internal combustion engine ICE and the electronic control unit PWT-ECU of the powertrain PWT may be integrated into a single electronic control unit ECU.

The single electronic control unit ECU or the two separate electronic control units E-ECU and PWT-ECU of the internal combustion engine ICE and of the powertrain PWT are designed to store and execute a software designed to control operation of the internal combustion engine ICE and of the gearbox G during the entering and leaving of the motor vehicle freewheel running condition with internal combustion engine off, which software is designed to implement, when executed, an operational control logic for the internal combustion engine ICE and the gearbox G for leaving a motor vehicle freewheel running condition with internal combustion engine off resulting from the above-mentioned study carried out by the Applicant.

Broadly speaking, this study has resulted in the development of a proactive operational control logic essentially based on the idea of appropriately controlling the motor vehicle gearbox, during the internal combustion engine run-down consequent upon the motor vehicle entering the freewheel running condition with internal combustion engine off, so as to cause, in cases of need, the inertial cranking of the internal combustion engine. In this way, if during the internal combustion engine run-down consequent upon the motor vehicle entering the freewheel running condition with internal combustion engine off the driver should have a so-called "change of mind" by performing an action that requires immediately leaving the motor vehicle freewheel running condition and if this occurs at a moment when the internal combustion engine operating conditions are no longer adequate to cause cranking of the internal combustion engine by fuel injection, but the motor vehicle speed is instead enough to cause inertial cranking of the internal combustion engine, then the latter can be inertially cranked up.

In particular, the operational control logic developed by the Applicant is essentially based on knowing the moment in time, during the internal combustion engine after run-down consequent upon the motor vehicle entering the freewheel running condition with internal combustion engine off, when the internal combustion engine leaves a so-called self-sustaining operating condition, which is normally defined as an engine speed range, but can also be alternatively defined as crank angles and/or rotations to be travelled, in which the internal combustion engine can be cranked up by fuel injection, and the lower limit of which is the so-called self-sustaining limit, above which the internal combustion engine can be cranked up by fuel injection and below which the internal combustion engine can no longer be cranked up by fuel injection.

The self-sustaining engine speed of an internal combustion engine is estimated by and stored in the electronic control unit of the internal combustion engine based on the inertia of the internal combustion engine and of the auxiliary mechanical devices, such as the alternator, air-conditioning system compressor, water pump, oil pump, etc., which are connected to the engine crankshaft by means of a belt or a chain and contribute to determining the resistance torque applied to the engine crankshaft, speeding up or slowing down the internal combustion engine run-down subsequent upon the motor vehicle entering the freewheel running condition with internal combustion engine off, with the drive line disengaged.

Therefore, the operational control logic developed by the Applicant substantially provides for controlling the gearbox, during the internal combustion engine run-down consequent upon the motor vehicle entering the freewheel running condition with internal combustion engine off, so as to engage a gear appropriate for inertial cranking of the internal combustion engine before it leaves the self-sustaining operating condition, at the same time keeping the clutch disengaged. In this way, if during the internal combustion engine run-down consequent upon the motor vehicle entering the freewheel running condition with internal combustion engine off, the driver should perform an action that requires immediately leaving the motor vehicle freewheel running condition and this occurs at a moment when the internal combustion engine has already left the self-sustaining operating condition, and therefore can no longer be cranked up by fuel injection, but the motor vehicle speed is enough to cause inertial cranking, then the internal combustion engine can still be inertially cranked up by simply engaging the clutch.

Considering that engagement of a gear in a gearbox requires a certain amount of time to be carried out, in order for the gear appropriate for inertial cranking of the internal combustion engine to be engaged before the moment when the internal combustion engine leaves the self-sustaining operating condition, the command for engaging this gear is necessarily to be given sufficiently in advance of this moment.

Figure 2:
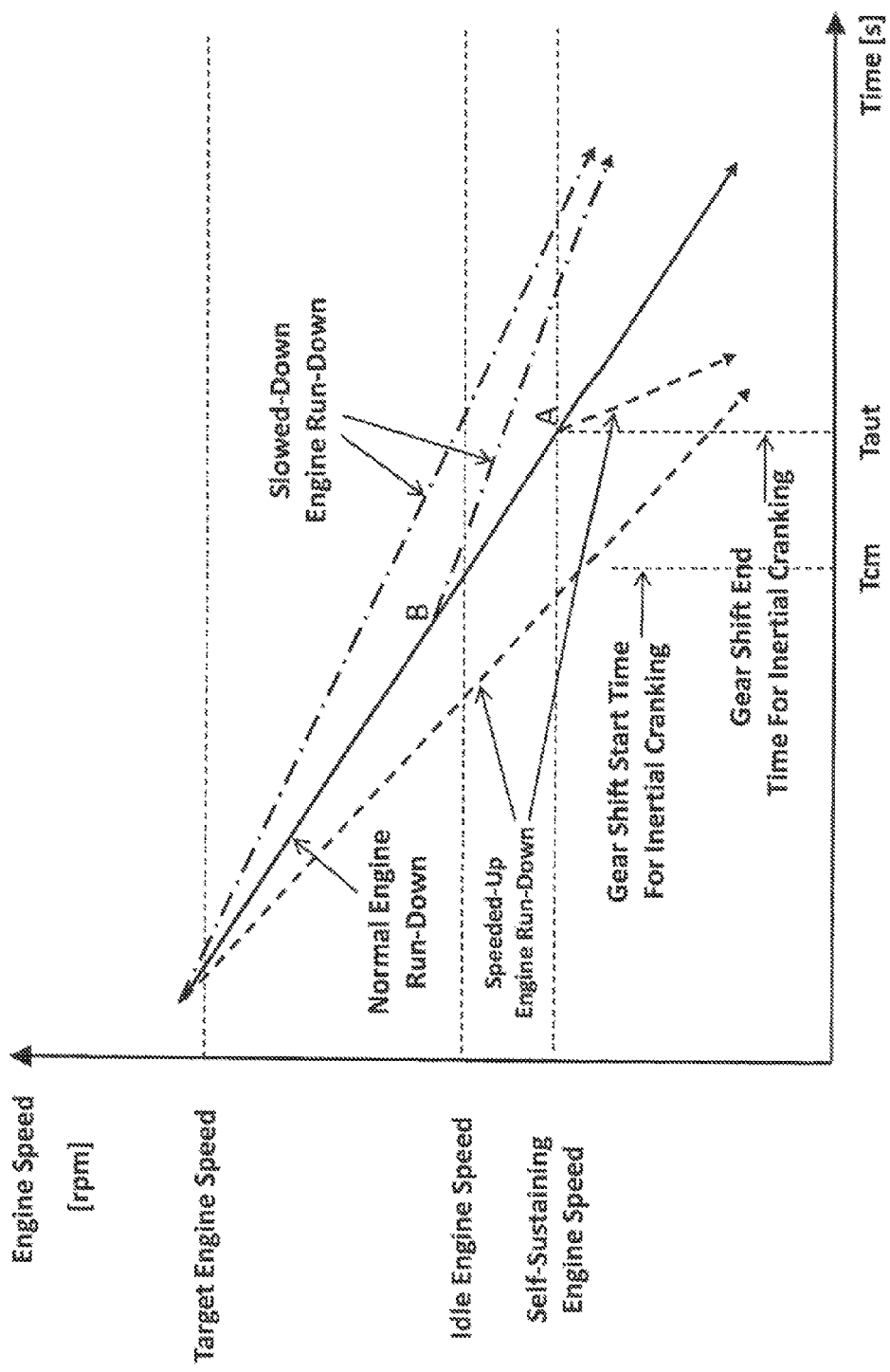
FIG. 2 shows the time development of an internal combustion engine speed during an internal combustion engine rundown when the motor vehicle is entering the freewheel running condition with internal combustion engine off.

The idea underlying the operational control logic developed by the Applicant is depicted in FIG. 2, which shows engine speed versus time during the internal combustion engine run-down consequent upon the motor vehicle entering the freewheel running condition with internal combustion engine off.

In particular, in FIG. 2, the time developments of a natural (spontaneous) internal combustion engine run-down, of a speeded up internal combustion engine run-down and of a slowed down internal combustion engine run-down, upon entering the motor vehicle freewheel running condition with internal combustion engine off and after it leaves the self-sustaining operating condition, are show by the inclined unbroken, dashed and dot-dash straight lines, respectively.

In addition, in FIG. 2, horizontal hatched lines show the self-sustaining engine speed (lower hatched line), the engine idle speed (intermediate hatched line) and the target engine speed on leaving the motor vehicle freewheel running condition with internal combustion engine off (upper hatched line).

The target engine speed on leaving the freewheel running condition with internal combustion engine off is the engine speed to which the internal combustion engine is brought by transferring torque from the wheels to the internal combustion engine, due to the engagement of the drive line with the engaged gear, and is equal to the product of the number of wheel revolutions multiplied by a transmission ratio, in turn equal to the product of the gear at the axle and the engaged gear. The internal combustion engine is brought to this target engine speed by an engine control management, in particular of the intake air during cranking and ignition advance, and of a clutch control management, optimized in order to speed up the motor vehicle's traction power without compromising fuel consumption. The two controls can either act in series, in the sense that the engine speed or torque control acts first with the clutch disengaged to reach the target engine speed and then, when the clutch is synchronized, the clutch is engaged, or in parallel, in the sense that the clutch is engaged and the internal combustion engine is simultaneously controlled in speed or torque so that adequate torque is transferred from the wheels to the internal combustion engine on leaving the freewheel running condition with the engine switched off.

Lastly, in FIG. 2, Taut indicates the time when the current engine speed reaches the self-sustaining engine speed during the normal internal combustion engine run-down and Tcm indicates the time when, if initiated at that time, engagement of a gear appropriate for inertial cranking of the engine completes at Taut, when the engine speed reaches the self-sustaining engine speed. In other words, the difference between Taut and Tcm represents the minimum advance, with respect to Taut, when the engine speed reaches the self-sustaining engine speed, with which it is necessary to initiate engagement of an appropriate gear for inertial cranking of the internal combustion engine so that engagement is completed not beyond, i.e. before or at the latest by, Taut, when the engine speed reaches the self-sustaining engine speed. Therefore, any engagement of an appropriate gear for inertial cranking of the engine carried out before Tcm will definitely complete before Taut.

Basically, the operation control logic developed by the Applicant provides for controlling, during the internal combustion engine run-down consequent upon the motor vehicle entering the freewheel running condition with internal combustion engine off, the engagement of an appropriate gear for inertial cranking of the internal combustion engine sufficiently in advance with respect to Taut, when the engine speed reaches the self-sustaining engine speed, so that this engagement is completed before Taut. In this way, if during the internal combustion engine run-down consequent upon the motor vehicle entering the freewheel running condition with internal combustion engine off, the driver performs an action that requires immediately leaving the motor vehicle freewheel running condition with internal combustion engine off and this must be carried out when the internal combustion engine has left the self-sustaining operating condition, and therefore can no longer be cranked up by fuel injection, but the motor vehicle speed is enough to cause inertial cranking, then the internal combustion engine can still be inertially cranked up by simply engaging the clutch.

Instead, in the case where leaving the motor vehicle freewheel running condition with internal combustion engine off takes place when the internal combustion engine has left the self-sustaining operating condition, but the motor vehicle speed is not enough to cause inertial cranking of the internal combustion engine, then this is expediently controlled so as to speed up the run-down, as shown by a dashed line in FIG. 2, by acting on the pumping losses and engine loads, so as to be able to crank up the internal combustion engine using the starter. It the starter is of the type that can only be engaged at zero speed, the internal combustion engine run-down is speed up so as to reach a complete engine stop, whilst if the starter is of the type able to be engaged at non-zero speeds, then the internal combustion engine run-down is speed up so as to reach an engine speed equal to the starter engagement speed.

In the example described above and shown in FIG. 2, the internal combustion engine run-down is speeded up from when the internal combustion engine leaves the self-sustaining operating condition. Under particular operating conditions, it may instead be expedient to speed up the internal combustion engine run-down right from when the motor vehicle, enters the freewheel running condition with internal combustion engine off, as shown in FIG. 2, always with a dashed line.

Instead, in the case where leaving the motor vehicle freewheel running condition with internal combustion engine off takes place when the internal combustion engine is in the self-sustaining operating condition, and can therefore be cranked up by fuel injection, and the engagement of the appropriate gear for inertial cranking of the internal combustion engine has already commenced but is not yet completed, this situation can handled in two ways:

first waiting until engagement of the appropriate, gear for inertial cranking of the internal combustion engine has been completed and the internal combustion engine has left the self-sustaining operating condition, and then engaging the clutch, thus causing inertial cranking of the engine, or cranking the internal combustion engine by fuel injection, aborting engagement of the appropriate gear for inertial cranking of the internal combustion engine, engaging an appropriate gear for the operating condition of the motor vehicle at the moment of the cranking the internal combustion engine, engaging the clutch and controlling the fuel injection so as to bring the current engine speed as quickly as possible to the aforesaid target engine speed on leaving the motor vehicle freewheel running condition with internal combustion engine off, represented by the upper hatched line in FIG. 2.

The operating condition of the motor vehicle at the moment of the cranking the internal combustion engine is defined by the motor vehicle speed, the gradient of the road that the motor vehicle is travelling along and the requested engine torque, in turn dependent on the position of the accelerator pedal at the moment of the cranking of the internal combustion engine, while the appropriate gear for the operating condition of the motor vehicle at the moment of the cranking of the internal combustion engine is that by means of which, in this operating condition of the motor vehicle, the internal combustion engine can produce the requested engine torque in the shortest possible time without compromising the driveability of the motor vehicle.

In order not to compromise the driveability of the motor vehicle, achieving the target engine speed can take place with or without the transfer of torque from the wheels to the internal combustion engine.

Given that the internal combustion engine run-down dynamics are usually very rapid, the appropriate gear for the operating condition of the motor vehicle on cranking the internal combustion engine is normally the same as that engaged at the moment of the motor vehicle entering the freewheel running condition with engine switched.

Furthermore, in the case where leaving the motor vehicle freewheel running condition with internal combustion engine off is to be carried out when the internal combustion engine is in the self-sustaining operating condition and engagement of the appropriate gear for inertial cranking of the internal combustion engine has not yet started, then the internal combustion engine is cranked up by fuel injection and fuel injection is controlled so as to bring the engine speed as quickly as possible to the aforesaid target engine speed.

If the gear that was engaged upon the motor vehicle entering the freewheel running condition with internal combustion engine off was not subsequently disengaged, then after cranking the internal combustion engine by fuel injection, the clutch is simply engaged.

Instead, if the gear that was engaged upon the motor vehicle entering the freewheel running condition with engine off was subsequently disengaged, then before anything else, an appropriate gear for the operating condition of the motor vehicle at the moment of cranking the internal combustion engine is engaged.

Given that the internal combustion engine run-down dynamics are usually very rapid, the appropriate gear for the operating condition of the motor vehicle at the moment of cranking the internal combustion engine is normally the same as that engaged at the moment of the motor vehicle entering the freewheel running condition with internal combustion engine off, and it therefore for this reason that it is expedient, and generally chosen, not to disengage the gear that was engaged upon entering the motor vehicle freewheel running condition with internal combustion engine off, consequently reducing the times of this action.

In this case as well, the target engine speed can be reached with or without transfer of torque from the wheels to the internal combustion engine in order not to compromise the driveability of the motor vehicle.

Finally, in the case where leaving the motor vehicle freewheel running condition with internal combustion engine off is to be carried out when the internal combustion engine is in the self-sustaining operating condition and engagement of the appropriate gear for inertial cranking of the internal combustion engine has been completed, then the internal combustion engine is cranked up by fuel injection, the gear suitable for inertial cranking of the engine disengaged, an appropriate gear for the operating condition of the motor vehicle at the moment of cranking the internal combustion engine then engaged and, lastly, the clutch is engaged.

Finally, it is understood that changes and modifications may be made to that described and illustrated herein without leaving the scope of protection of the present invention, as defined in the appended claims.

For example, permanence of the internal combustion engine in the self-sustaining condition can be extended in time by opportunely controlling the internal combustion engine so as to slow the final run-down, in particular by reducing the pumping losses and/or engine loads, as shown by a dot-dash line in FIG. 2.

In the example shown in FIG. 2, the internal combustion engine run-down is slowed right from the moment when the motor vehicle enters the freewheel running condition with the internal combustion engine switched off. In particular operating conditions, it may instead be expedient to start with a natural internal combustion engine run-down upon entering the freewheel running condition with the internal combustion engine switched off and only subsequently slow the run-down, as shown in FIG. 2, always with a dot-dash line.

The invention claimed is:

1. An automotive electronic control system for a powertrain of a motor vehicle, the powertrain comprising:
   an internal combustion engine; and
   a servo-actuated drive line comprising a gearbox and a clutch;
   wherein the automotive electronic control system is configured to:
      control the powertrain to stop the internal combustion engine and disengage the drive line, whereby the motor vehicle enters a freewheel running condition with internal combustion engine off, and crank the internal combustion engine and engage the drive line, whereby the motor vehicle leaves the freewheel running condition with internal combustion engine off;
      wherein, if the motor vehicle freewheel running condition with internal combustion engine off is to be left during an internal combustion engine run-down consequent upon the motor vehicle entering the freewheel running condition with internal combustion engine off, control the powertrain so as to:
         if the internal combustion engine is in a self-sustaining operating condition and engagement of a gear appropriate for inertial cranking of the internal combustion engine has been started but is not yet completed:
            wait until the internal combustion engine has left the self-sustaining operating condition and engagement of the gear appropriate for inertial cranking of the internal combustion engine has been completed and then cause engagement of the clutch, whereby resulting in the internal combustion engine being inertially cranked, or
            cause cranking of the internal combustion engine by means of fuel injection, cause abort of engagement of the gear appropriate for inertial cranking of the internal combustion engine, cause engagement of a gear appropriate for the motor vehicle operating condition at the moment in which the internal combustion engine is cranked up, and, finally, cause engagement of the clutch; and
         control the drive line during an internal combustion engine run-down consequent upon the motor vehicle entering the freewheel running condition with the internal combustion engine off, to cause engagement of a gear appropriate for inertial cranking of the internal combustion engine before the internal combustion engine leaves a self-sustaining operating condition, while the clutch is kept disengaged.

2. The automotive electronic control system according to claim 1, further configured to:
   detect occurrence of a condition that requires leaving the motor vehicle freewheel running condition with internal combustion engine off, and
   if the motor vehicle freewheel running condition with internal combustion engine off is to be left during an internal combustion engine run-down consequent upon the motor vehicle entering the freewheel running condition with internal combustion engine off, control the powertrain so as to:
      if the internal combustion engine is not in a self-sustaining operating condition:
         if the motor vehicle speed is enough to cause inertial cranking of the internal combustion engine, cause engagement of the clutch, whereby resulting in the internal combustion engine being inertially cranked, or
         if the motor vehicle speed is not enough to cause inertial cranking of the internal combustion engine, cause speed up of the internal combustion engine run-down and then cranking of the internal combustion engine, by means of the starter.

3. The automotive electronic control system according to claim 2, further configured to:
   if the motor vehicle freewheel running condition with internal combustion engine off is to be left during the internal combustion engine run-down consequent to the motor vehicle entering the freewheel running condition with internal combustion engine off, control the powertrain so as to:
      if the internal combustion engine is in the self-sustaining operating condition and engagement of a gear appropriate for inertial cranking of the internal combustion engine has not yet started:
         cause cranking of the internal combustion engine by means of fuel injection, and if the gear that was engaged when the motor vehicle entered the freewheel running condition with internal combustion engine off has not been subsequently disengaged, cause engagement of the clutch, or if the gear that was engaged when the motor vehicle entered the freewheel running condition with internal combustion engine off has been subsequently disengaged, cause engagement of a gear appropriate for the motor vehicle operating condition at the moment in which the internal combustion engine is cranked up, and then cause engagement of the clutch.

4. The automotive electronic control system according to claim 2, further configured to:

if the motor vehicle freewheel running condition with internal combustion engine off is to be left during the internal combustion engine run-down consequent to the motor vehicle entering the freewheel running condition with internal combustion engine off, control the powertrain so as to:

if the internal combustion engine is in the self-sustaining operating condition and engagement of a gear appropriate for inertial cranking of the internal combustion engine has been completed:

cause cranking of the internal combustion engine by means of fuel injection, cause disengagement of the gear appropriate for inertial cranking of the internal combustion engine, cause engagement of a gear appropriate for the motor vehicle operating condition at the moment in which the internal combustion engine is cranked up, and cause engagement of the clutch.

5. The automotive electronic control system according to claim 1, further configured to control fuel injection in the internal combustion engine during cranking by mean of fuel injection so as to bring a current engine speed to a target engine speed on leaving the motor vehicle freewheel running condition with internal combustion engine off.

6. The automotive electronic control system according to claim 1, further configured to control the internal combustion engine so as to extend permanence thereof in the self-sustaining condition.

7. The automotive electronic control system according to claim 1, comprising an electronic control unit for the internal combustion engine and an electronic control unit for the powertrain, and connected to the electronic control unit for the internal combustion engine via a motor vehicle CAN, and wherein the electronic control units are programmed to cause the automotive electronic control system to:

control the powertrain to stop the internal combustion engine and disengage the drive line, whereby the motor vehicle enters a freewheel running condition, and crank the internal combustion engine and engage the drive line, whereby the motor vehicle leaves the freewheel running condition; and control the drive line during an internal combustion engine run-down consequent upon the motor vehicle entering the freewheel running condition, to cause engagement of a gear appropriate for inertial cranking of the internal combustion engine before the internal combustion engine leaves a self-sustaining operating condition, while the clutch is kept disengaged.

8. The automotive electronic control system according to claim 1, comprising a single electronic control unit for both the internal combustion engine and the powertrain, and programmed to cause the automotive electronic control system to:

control the powertrain to stop the internal combustion engine and disengage the drive line, whereby the motor vehicle enters a freewheel running condition, and crank the internal combustion engine and engage the drive line, whereby the motor vehicle leaves the freewheel running condition; and control the drive line during an internal combustion engine run-down consequent upon the motor vehicle entering the freewheel running condition, to cause engagement of a gear appropriate for inertial cranking of the internal combustion engine before the internal combustion engine leaves a self-sustaining operating condition, while the clutch is kept disengaged.

9. An automotive electronic control unit for at least one of an internal combustion engine and a powertrain of a motor vehicle programmed to:

control the powertrain to stop the internal combustion engine and disengage a drive line, whereby the motor vehicle enters a freewheel running condition, and crank the internal combustion engine and engage the drive line, whereby the motor vehicle leaves the freewheel running condition; and control the drive line during an internal combustion engine run-down consequent upon the motor vehicle entering the freewheel running condition, to cause engagement of a gear appropriate for inertial cranking of the internal combustion engine before the internal combustion engine leaves a self-sustaining operating condition, while the clutch is kept disengaged, wherein, if the motor vehicle freewheel running condition with internal combustion engine off is to be left during an internal combustion engine run-down consequent upon the motor vehicle entering the freewheel running condition with internal combustion engine off, control the powertrain so as to:

if the internal combustion engine is in a self-sustaining operating condition and engagement of a gear appropriate for inertial cranking of the internal combustion engine has been started but is not yet completed:

wait until the internal combustion engine has left the self-sustaining operating condition and engagement of the gear appropriate for inertial cranking of the internal combustion engine has been completed and then cause engagement of the clutch, whereby resulting in the internal combustion engine being inertially cranked, or cause cranking of the internal combustion engine by means of fuel injection, cause abort of engagement of the gear appropriate for inertial cranking of the internal combustion engine, cause engagement of a gear appropriate for the motor vehicle operating condition at the moment in which the internal combustion engine is cranked up, and, finally, cause engagement of the clutch.

10. A motor vehicle comprising a powertrain including an internal combustion engine, a servo-actuated drive line in turn comprising a gearbox and a clutch, and an automotive electronic control system, wherein the automotive electronic control system is configured to:

control the powertrain to stop the internal combustion engine and disengage the drive line, whereby the motor vehicle enters a freewheel running condition with internal combustion engine off, and crank the internal combustion engine and engage the drive line, whereby the motor vehicle leaves the freewheel running condition with internal combustion engine off; wherein, if the motor vehicle freewheel running condition with internal combustion engine off is to be left during an internal combustion engine run-down consequent upon the motor vehicle entering the freewheel running condition with internal combustion engine off, control the powertrain so as to:
- if the internal combustion engine is in a self-sustaining operating condition and engagement of a gear appropriate for inertial cranking of the internal combustion engine has been started but is not yet completed:
  - wait until the internal combustion engine has left the self-sustaining operating condition and engagement of the gear appropriate for inertial cranking of the internal combustion engine has been completed and then cause engagement of the clutch, whereby resulting in the internal combustion engine being inertially cranked, or
  - cause cranking of the internal combustion engine by means of fuel infection, cause abort of engagement of the gear appropriate for inertial cranking of the internal combustion engine, cause engagement of a gear appropriate for the motor vehicle operating condition at the moment in which the internal combustion engine is cranked up, and, finally, cause engagement of the clutch; and
- control the drive line during an internal combustion engine run-down consequent upon the motor vehicle entering the freewheel running condition with the internal combustion engine off, to cause engagement of a gear appropriate for inertial cranking of the internal combustion engine before the internal combustion engine leaves a self-sustaining operating condition, while the clutch is kept disengaged.

11. A non-transitory computer readable medium comprising software loaded onto the non-transitory computer readable medium in an automotive electronic control unit of an automotive electronic control system, wherein the software loaded onto the non-transitory computer readable medium is designed to cause, when executed, the automotive electronic control system to:
- control the powertrain to stop the internal combustion engine and disengage the drive line, whereby the motor vehicle enters a freewheel running condition, and crank the internal combustion engine and engage the drive line, whereby the motor vehicle leaves the freewheel running condition; wherein, if the motor vehicle freewheel running condition with internal combustion engine off is to be left during an internal combustion engine run-down consequent upon the motor vehicle entering the freewheel running condition with internal combustion engine off, control the powertrain so as to:
  - if the internal combustion engine is in a self-sustaining operating condition and engagement of a gear appropriate for inertial cranking of the internal combustion engine has been started but is not yet completed:
    - wait until the internal combustion engine has left the self-sustaining operating condition and engagement of the gear appropriate for inertial cranking of the internal combustion engine has been completed and then cause engagement of the clutch, whereby resulting in the internal combustion engine being inertially cranked, or
    - cause cranking of the internal combustion engine by means of fuel injection, cause abort of engagement of the gear appropriate for inertial cranking of the internal combustion engine, cause engagement of a gear appropriate for the motor vehicle operating condition at the moment in which the internal combustion engine is cranked up, and, finally, cause engagement of the clutch; and
  - control the drive line during an internal combustion engine run-down consequent upon the motor vehicle entering the freewheel running condition, to cause engagement of a gear appropriate for inertial cranking of the internal combustion engine before the internal combustion engine leaves a self-sustaining operating condition, while the clutch is kept disengaged.

\* \* \* \* \*